United States Patent [19]

MacPherson

[11] Patent Number: 4,972,175
[45] Date of Patent: Nov. 20, 1990

[54] SECURITY ENCLOSURES

[76] Inventor: Hugh MacPherson, 12 Balfour Cresent Milnathort, Kinross, Scotland, KY13 7TA

[21] Appl. No.: 366,905

[22] Filed: Jun. 15, 1989

[30] Foreign Application Priority Data

Jun. 17, 1988 [GB] United Kingdom ............. 8814471

[51] Int. Cl.$^5$ .............................................. G08B 13/00
[52] U.S. Cl. .................................. 340/550; 109/42
[58] Field of Search ............... 340/550; 324/65 R; 109/25, 29–44; 241/36, 39

[56] References Cited

U.S. PATENT DOCUMENTS

| | | | |
|---|---|---|---|
| 4,399,430 | 8/1983 | Kitchen | 340/550 |
| 4,578,670 | 3/1986 | Joergensen | 340/550 |
| 4,692,744 | 9/1987 | Hickman | 340/550 |
| 4,785,743 | 11/1988 | Dalphin | 340/550 X |
| 4,814,749 | 3/1989 | Abramson | 241/36 X |
| 4,847,596 | 7/1989 | Jacobson et al. | 340/550 |
| 4,859,989 | 8/1989 | MacPherson | 340/550 X |

FOREIGN PATENT DOCUMENTS 88200099.5 8/1988 European Pat. Off. .
PCT/GB87/-
00289 11/1987 PCT Int'l Appl. .
1375926 12/1974 United Kingdom .

Primary Examiner—Joseph A. Orsino
Assistant Examiner—Thomas J. Mullen, Jr.

[57] ABSTRACT

A security enclosure is formed from layers of flexible material. One layer carries a flexible semiconductive line arranged to extend over the whole area of the enclosure. Any interruption of the line by unauthorized opening of the enclosure changes the resistance of the line and so can be detected by a monitoring circuit. Further, two layers of semiconductive fibers also cover the whole area of the enclosure and are separated by an insulating layer. The length of the fibers is greater than the thickness of the insulating layer so that if the enclosure is pierced fibers from one layer will be forced into contact with fibers from the other layer. This will change the combined resistance of the layers and this can also be detected by a monitoring circuit. The two measures can be used separately.

26 Claims, 10 Drawing Sheets

TO MONITORING CIRCUIT

4,972,175

SECURITY ENCLOSURES

FIELD OF THE INVENTION

This invention relates to a security enclosure for giving warning, or erasing information, if attempted interference is made with an object within the enclosure. The invention also relates to sheets and laminates for use in making such enclosures.

The system is particularly applicable to the protection of items such as documents, magnetic information store or electronic circuits containing memory information. The security enclosure completely encapsulates the item being protected but may have an interconnecting plug bonded into it to allow operation of the enclosed item, such as a printed circuit board.

BACKGROUND OF THE INVENTION

Documents or magnetic files, containing security sensitive information have to be sent throughout the world and it is often necessary to ensure that the documents have not been interfered with in transit or that if any attempt is made to reveal the information by an unauthorized person, an alarm is sounded or the information destroyed or erased.

Printed circuit boards in computers or data conversion equipment, often contain memory devices which should not be read (electronically), by anyone but authorized people. Any attempt to tap on to the board or device should ideally result in an erasure of all memory information.

The enclosure should provide protection from many forms of attack, from very crude destructive attacks to highly sophisticated laboratory attacks, but at the same time be sufficiently insensitive as not to be triggered by normal environmental effects such as temperature, humidity and vibration. Also in the case of printed circuit boards which must operate in the enclosure, the cable entry must not compromise the security of the enclosure and the enclosure must be sufficiently thermally conductive to stop the circuit from overheating.

A previous proposal is described in a paper entitled "Physical Security for the ABYSS System" by Steve H. Weingart, of I.B.M. in 1987 IEEE proceedings 49 89 4612 48B.

The system previously proposed uses very fine insulated wire which is wrapped around the device to be protected. The complete device is then potted in epoxy resin. The fine wire forms a long resistive element which is connected to a monitor circuit to detect changes in resistance.

However, this type of security enclosure has the following disadvantages:

1. No means of inserting the article to be protected after the enclosure has been fabricated.
2. In order to get high coverage, a lot of wire is used causing significant size and weight increase.
3. Corners are very difficult to cover. Ideal shape for this type of device is a sphere, but not many electronic circuits are this shape.
4. X-rays may be used to detect low coverage areas.
5. Epoxy can be scraped away to reveal elements which can be carefully tapped to create a hole.
6. Not practical for securing items which would be removed from the enclosure after a period of time.

SUMMARY OF THE INVENTION

According to a first aspect of the invention there is provided a security enclosure comprising a flexible sheet of an insulating material extending over the whole of the area of the enclosure and carrying a flexible linear electrically responsive element on at least one surface thereof, said element being arranged in a configuration on said surface so dividing the surface that attempted opening of the enclosure changes an electrical characteristic of the element, the change being detectable by an electrical circuit.

The enclosure may form a container or may be in the form of a pad.

Preferably the linear electrically responsive element comprises a line of a semiconductive material. The line may be printed on the sheet of insulating material using a semiconductive ink. The semiconductive ink preferably contains carbon, and may have a resistivity of between 0.1 and 10 ohm-cm.

The linear electrically responsive element may be arranged on both sides of the flexible sheet of insulating material. In this case, the linear element may comprise an array of parallel lines on each side of the sheet of insulating material extending between spaced points arranged around the edge of the sheet, preferably in an imaginary rectangle, the points on one side of the sheet being in register with the points on the other side, and the lines on one side of the sheet extending obliquely relative to the lines on the other side and being interconnected thereto at the registering points to thereby form a single conductor dividing the sheet of insulating material into a matrix of relatively small areas.

The lines on each side of the sheet of insulating material may be parallel to each other whereby the sheet is divided into a matrix of diamond shaped areas, the largest dimension of each diamond shaped area preferably being not more than 10 mm.

The interconnection between the lines at the points may be by a conductive adhesive extending through the flexible sheet.

Preferably, the flexible sheet of insulating material is provided with an outer layer of opaque material which covers the linear electrically responsive element.

The security enclosure, in operation, also includes a monitor circuit connected to the linear electrically responsive element for producing an electrical output when the electrical characteristic of the element changes on opening of the enclosure.

According to a second aspect of the invention there is provided a security enclosure comprising two flexible layers of electrically responsive fibrous material separated by a layer of a flexible insulating material, the layers extending over the whole area of the enclosure, and the length of the fibers of the fibrous material being greater than the thickness of the layer of insulating material so that piercing of the enclosure forces fibers from one of said layers of fibrous material to penetrate the layer of insulating material and contact the other of said layers of fibrous material to change an electrical characteristic of the layers of fibrous responsive material, said change being detectable by an electrical circuit.

The layers of electrically responsive fibrous material may be layers of semiconductive fibers whose combined resistance changes on piercing.

The second aspect of the invention may be employed by itself or in combination with the first aspect, and in the latter case the layers of electrically responsive fibrous material are preferably arranged over the flexible sheet of insulating material carrying the linear electrically responsive element and separated therefrom by a further layer of insulating material.

Where the electrically responsive element and layers are of semiconductive material, the linear electrically responsive element may be connected electrically between the layers of electrically responsive fibrous material so that piercing of the layers of electrically responsive fibrous material forms two parallel resistive elements.

The connection may be formed by a connection strip which is incorporated into the enclosure on closing and which carries tracks forming the required connections.

In this case and where a monitor circuit is provided, the monitor circuit is preferably connected across the ends of the linear electrically responsive element and to the electrically responsive fibrous layers for detecting changes in electrical resistance thereof and/or open or short circuits.

BRIEF DESCRIPTION OF THE DRAWINGS

The following is a more detailed description of some embodiments of the invention, by way of example, reference being made to the accompanying drawings in which.

DETAILED DESCRIPTION OF THE INVENTION

Figure 1:
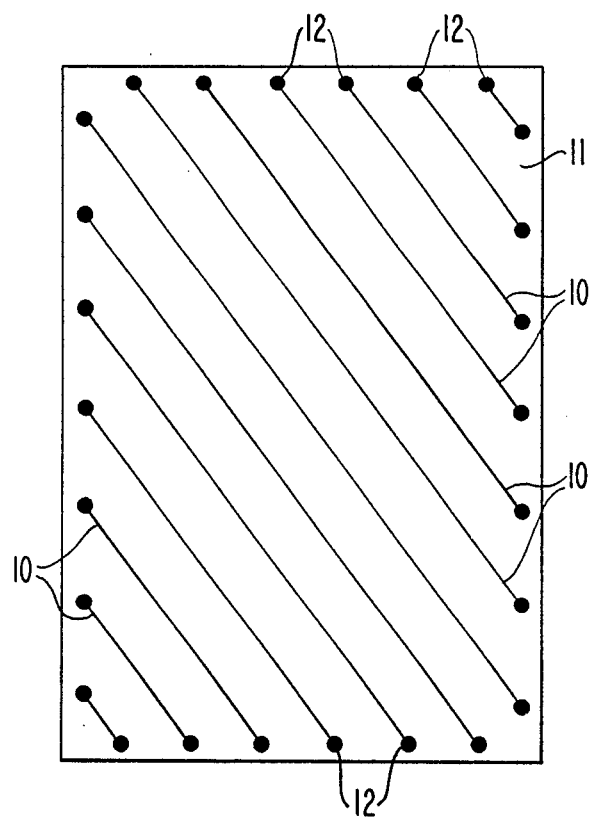
FIG. 1 is a schematic plan view of one side of a flexible sheet for use in forming a security enclosure in accordance with the first aspect of the invention.

The security enclosure sheet shown in FIG. 1 to 4 comprises a matrix of diagonally extending semiconductive lines 10 printed on to a rectangular thin insulating film 11 Each line 10 terminates at each end in a semiconductive dot 12 adjacent the edge of the film as shown in FIG. 1, the pattern of lines and dots being printed on to the insulating film 11 using a semiconductive ink.

Figure 2:
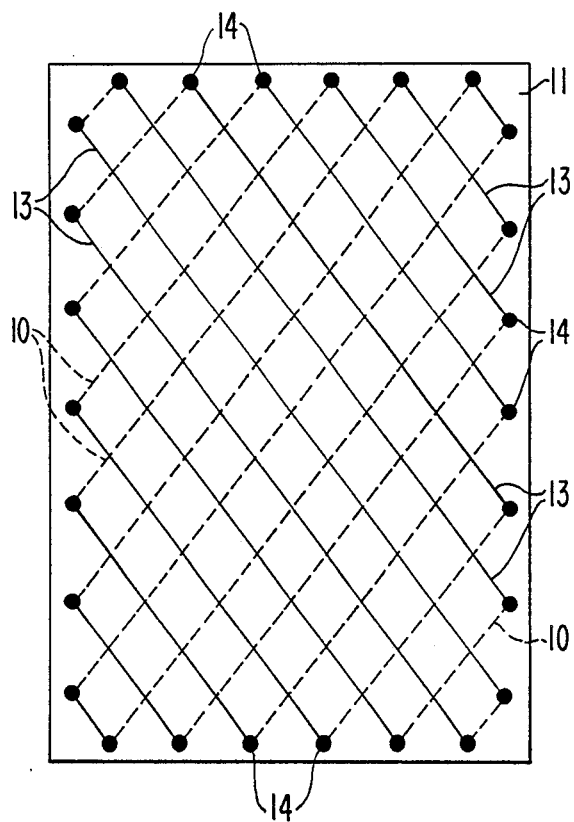
FIG. 2 is a schematic plan view of the other side of the sheet shown in FIG. 1 with the first side being shown in broken lines.
Figure 3:
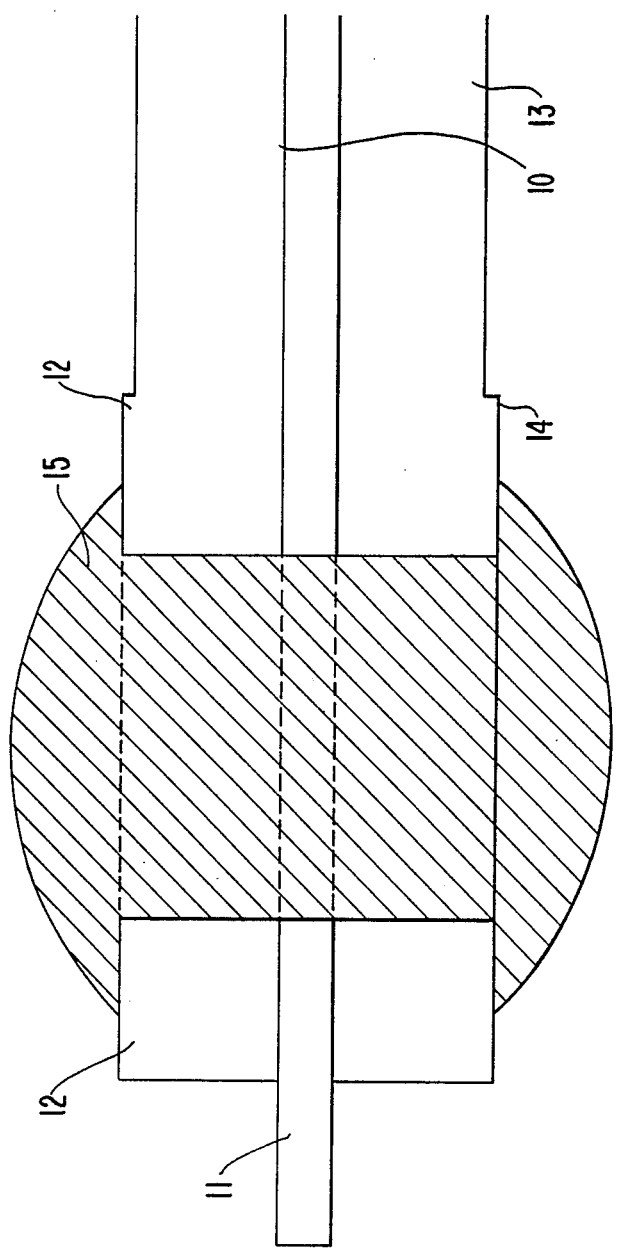
FIG. 3 is a schematic section through a portion of the sheet of FIGS. 1 and 2 showing the interconnection of semiconductive dots of the sheet.

A similar pattern of semiconductive lines 13 and dots 14 are printed on to the reverse side of the film 11 as shown in FIG. 2. The dots 12 of FIG. 1 and 14 are in register and are electrically connected through the film by one of a number of means. For example, a hole may be punched in the center of each dot 12, 14 and a conductive adhesive 15 applied to the hole, to bridge the top dot 12 to the bottom dot 14, as shown in FIG. 3.

This matrix of lines 10, 13 now forms a continually connected circuit which will be broken if attempts are made to penetrate the film by cutting, abrasion, application of solvents, or application of heat.

Figure 4:
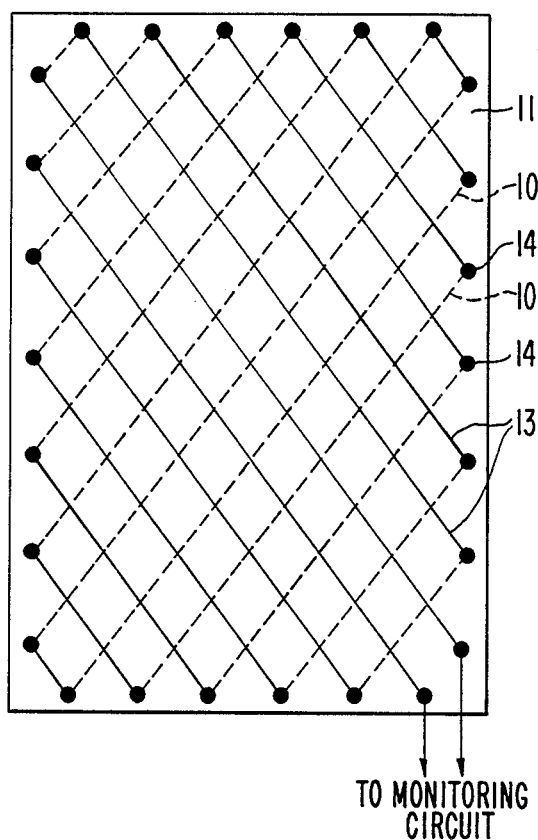
FIG. 4 is a similar view to FIG. 2 but showing the electrical connection of the security circuit formed on the sheet.

The monitoring of the circuit is done by opening the circuit at one point and measuring the change of resistance between the two ends of the circuit, as shown in FIG. 4. Even if the lines 10, 13 could be identified, it would be almost impossible to tap across sections of the lines 10, 13 to produce a useful size of hole, due to the relative random nature of the pattern. Adjacent lines 10, 13 are of quite different potential because they are far from each other in the electrical circuit, despite being close physically.

Typically, the dots 12. 14 would be spaced, such as to produce a matrix of diamond shaped areas of largest dimension less than 10 mm. The film 11 is then overprinted with a layer of nonconductive ink, so as to conceal the matrix. It is preferred that carbon is used to provide the semiconducting properties of the matrix, since it is most easily concealed to sophisticated investigation techniques such as X-ray examination.

Preferred materials for the matrix are polyester film for the thin insulating film 11, 0.025 mm or less thick, and carbon filled polyester adhesive for the lines 10, 13 and dots 12, 14 applied by screen printing. Typically the lines 10, 13 may be 1 mm wide and the dots 12, 14 may be 3 mm in diameter and 0.025 mm – 0.2 mm thick, depending on the overall resistance required. The carbon will be chosen to produce low resistivity for low volume filling. Typically a track may be formed with a resistivity of 6 ohms-cm for a 15% carbon loading in polyester.

The over-printing layer (not shown) would also be a carbon loaded polyester film. In this case the carbon would be chosen to produce high color (jetness) with low loading and minimum change to electrical resistance. Typically a resistivity higher than $10^{13}$ ohms-cm can be achieved for a 2% loading, while providing good jetness.

A completed security enclosure may be formed in the following way.

Figure 5A:
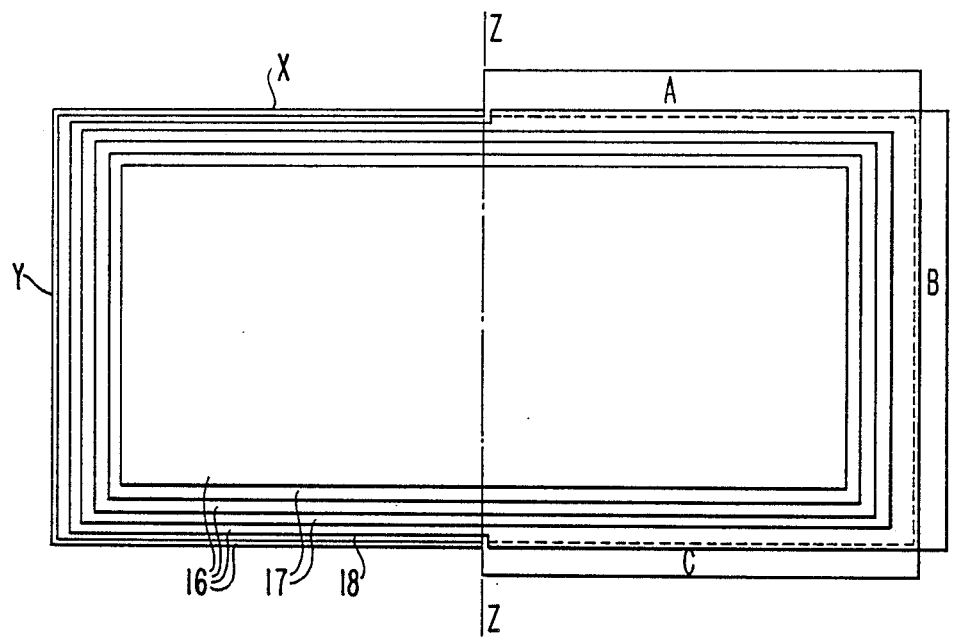
FIG. 5a, 5b and 5c are a plan view, an exploded side view and a side elevation respectively of a flexible laminate for use in forming a security enclosure incorporating both aspects of the invention.
Figure 5B:
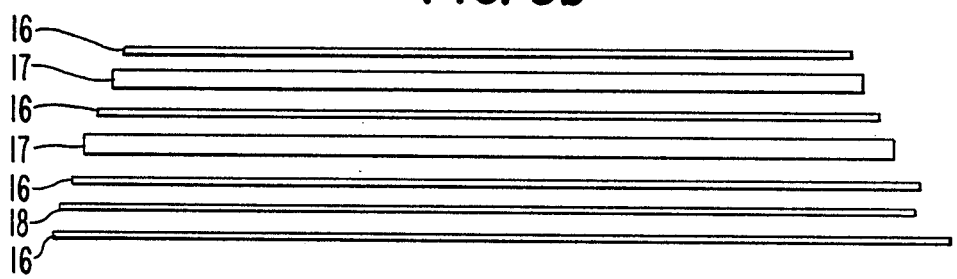

First the rectangular component parts are assembled in the order shown in FIG. 5b. Layers 16 are thin insulating films, e.g. of polyester, layers 17 are films of semiconductive fibers, and layer 18 is a film having a completed matrix of semiconductive tracks as described above with reference to FIGS. 1 to 4.

Each semiconductive layer 17 is made throughout of a fibrous material such that, in use, if a sharp object penetrates the layers, the object will pull fragments of the upper semiconductive layer through the intervening insulating layer 16 to touch, and to make electrical contact with, the lower semiconductive layer. In order to have a high probability of a conductive path being formed, the insulating layer should be thinner than the mean length of the conductive fibers produced by pushing an object through the semiconductive layer. The insulating layer should therefore be no thicker than, and preferably is thinner than, the semiconductive layer. Typically the thickness of the semiconductive layers 17 may be 0.075 mm, and the thickness of the insulating layers 16 may be no more than 0.025 mm. The preferred semiconductive fibrous material is unsintered, carbon-loaded polytetrafluoroethylene (PTFE) having a volume resistivity of typically from 1 to 10 ohms-cm, and the preferred insulating material is polyester film.

Adhesive is applied between the layers 16, 17 and 18, and the complete laminate assembly is then thermally bonded in a hot press. A typical thickness for the laminate is 0.5 mm.

It will be seen that dimensions in the drawings are exaggerated for clarity and that the sizes of the layers increase successively towards the lowermost layer 16. The edges of the layers 16, 17, 18 in the laminate are thus stepped downwardly, and it will be noted that the lowermost insulating film layer 16 is provided with a flap B at one end and side flaps A and C extending from the flapped end to the center line Z—Z bisecting the respective sides. It will also be noticed that the corresponding half of the insulating film layer 16 immediately above the layer 1B has its edges extended sufficiently to cover the corresponding edges of the layer 1B.

Figure 6:
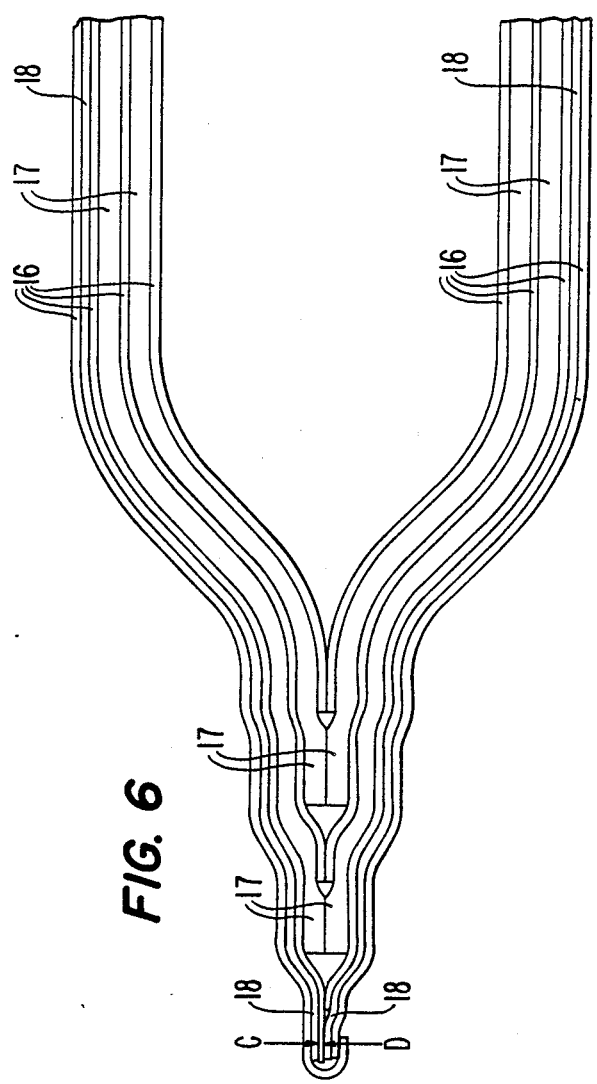
FIG. 6 is a partial cross-section of an edge of a completed security enclosure formed from the laminate shown in FIG. 5, showing the interconnection of the layers of the enclosure.

The flat laminate so produced is folded along the center line Z—Z and, after further adhesive has been applied along the edges X and Y of the lowermost three layers 16, 18, is sealed along these edges X and Y. Flaps A and B are folded over to mechanically complete this stage and thus make an open ended bag or envelope. FIG. 6, shows the arrangement at one of the sealed edges.

Since the matrix layer 1B extends very close to the edges of the completed enclosure and the two sides of the matrix layer 18 make the final bond at points marked C and D and are separated only by one thin layer 16 of insulation, any attempt to pry open the edge will result in breaking the circuit on the matrix layer 18. The adhesive used for laminating and bonding the edges, and the adhesive used in the semiconductive ink on the matrix are identical, and therefore any solvents used to dissolve the edge adhesive will also dissolve the matrix lines 10. 13. Also, due to the carbon filling of the ink on the matrix, this bond has a lower tensile strength and elongation compared to the other adhesives used which are not loaded to the same degree by additional solids.

Figure 5C:
Figure 7:
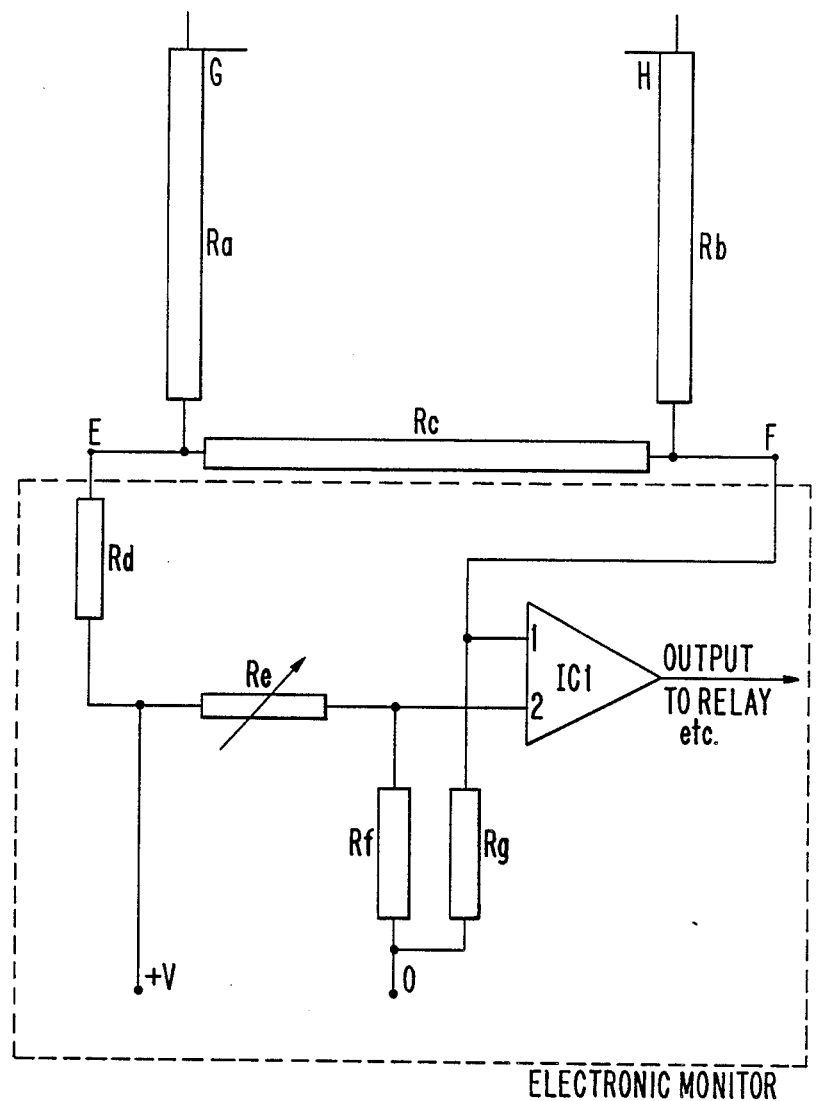
FIG. 7 is a diagram of a circuit for use with the security enclosure of FIGS. 5 and 6.

Termination of the semiconductive lines 10, 13 of the layer 18 to an electronic monitor board included within the enclosure, will vary according to the application. In general the electrical monitor circuit will be as in FIG. 7. Ra and Rb represent the two semiconductive layers 17, (see FIGS. 5 and 6), and Rc represents the semiconductive lines 10, 13 of the matrix.

IC1 is a window comparator with the center of the window referenced by the voltage divider Re and Rf. The size of the window is controlled by other resistive elements not shown but follow conventional electronic design practice.

The comparator therefore monitors the voltage at Pin 1 which is controlled by the resistance chain Rd, Rc and Rg. Since Rd and Rg are fixed, any change to Rc will result in IC1 changing state and giving an output, which may be used in a variety of ways according to the application. Therefore, if the track of the matrix is broken or shorted, V (pin 1) will increase or decrease and cause an output at IC1. Similarly, if an attempted interception is made by piercing, semiconductive fibers will be drawn from one semiconductive layer 17 to the other, causing a short circuit between Ra and Rb and thus changing the resistance between points E and F in FIG. 7. Provided Ra and Rb are not significantly larger than Rc a substantial change to the loop resistance will result, causing IC1 to change state. For example if Ra=Rb=Rc, the least change of resistance will occur if a short circuit is made between points G and H in FIG. 7. The new resistance between points E and F will be:

$$\frac{1}{REF} = \frac{1}{Rc} + \frac{1}{Ra + Rb}$$
$$= \frac{1}{Rc} + \frac{1}{2Rc}$$
$$= \frac{3}{2Rc}$$

Therefore $REF = \frac{2Rc}{3}$

Therefore, the resistance change between points E and F will be from Rc to $\frac{2}{3}$ Rc and this change can easily be detected.

Thus the enclosure is protected both from piercing and from tearing.

A significant advantage to the enclosure described above with reference to the drawing is that connections to the two semiconductive layers and the matrix can be made anywhere on these elements. It is possible therefore, that for any one enclosure design there will be a number of permutations of termination positions, making it impossible for a would-be interceptor to predict where the terminations have been made.

Typically, a would-be interceptor would acquire one or more of these enclosures in advance to practice the technique of interception, and any randomness in the design would prove very frustrating.

Figure 8:
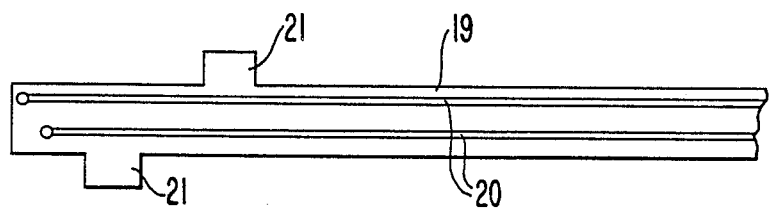
FIG. 8 is a plan view of a connection strip for use with the security enclosure of FIGS. 5 to 7, the member having flaps in an unfolded condition.
Figure 9:
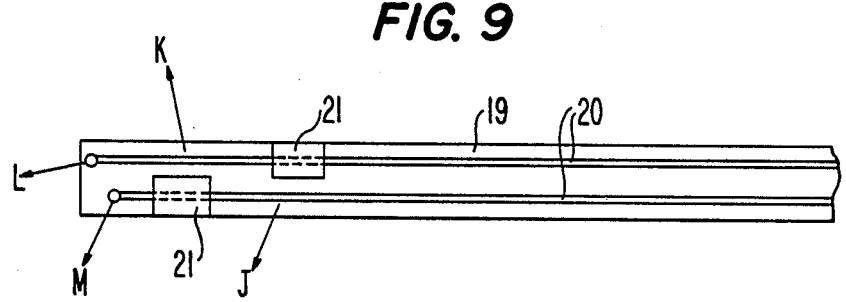
FIG. 9 is a view similar to FIG. 8 but showing the flaps in a folded condition.
Figure 10:
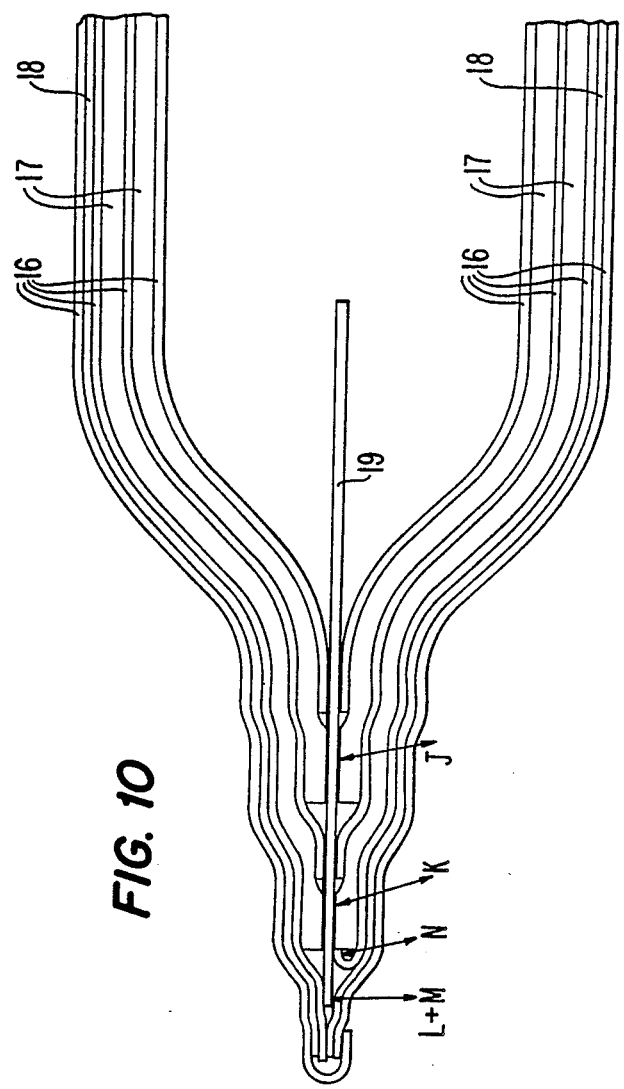
FIG. 10 is a similar view to FIG. 6 but showing the connection strip in position in the enclosure.

Termination to the security enclosure can be achieved by a number of means; one example of a connection strip being shown in FIGS. 8 and 9. A strip of this insulating film 19 coated with insulating adhesive is cut in the shape shown. Two semiconductive tracks 20 are printed on to the film and the two flaps 21 folded and sealed to insulate portions of the tracks. At the stage in the formation of the enclosure that layers are being laminated (see FIGS. 5a, 5b and 5c) this film 19 is placed at an edge and terminated on to the matrix using conductive adhesive. When the enclosure is folded and sealed the semiconductive tracks 20 automatically make connection with the two semiconductive layers 17 and the inner end is terminated on to the monitoring circuit in the enclosure. FIG. 10 shows the position of the connection strip in the enclosure. Termination is to the first semiconductive layer at point J, to the second semiconductive layer at point K, and to the matrix at points L and M.

The only modification required to the enclosure is that a small portion of the third insulating layer 16, between the second semiconductive layer 17 and the matrix 18, is cut back and folded to seal with the connection strip 19 as shown at point N in FIG. 10.

In order to add further randomness to the design, the positions of the flaps 21 on the connection strip 19 may be exchanged so as to change the relevant positions of Ra and Rb in the electrical circuit.

At this stage the device has been shown to be an open ended security enclosure with a means of terminating the electrical elements of the enclosure to a monitor circuit.

In the simplest use of the security envelope, for example to carry security sensitive papers or magnetic media, the items to be secured are placed in the enclosure beside the monitor circuit and the open end sealed thermally. The flap C (see FIG. 5a) is folded over and sealed to provide mechanical strength to the edge joint.

During this operation the circuit has been maintained in the enclosure layers and therefore from the point of switching the monitor "ON" and completion of the sealing operation, there has not been any disturbance to the electrical circuit. After a time period or when the enclosure reaches its final destination and is to be opened, it is of course essential to verify that the enclosure integrity has been maintained since it was sealed. This may be done in several ways; an elapsed time indicator may be fitted to the output of the monitor which would start running from the time an interception was detected. This of course would also start at the time the enclosure was finally opened but immediately checking the indicator would verify any interception during transit. An alarm of course may be fitted to activate as soon as an interception was detected. Both methods will indicate, in a non destructive way, that the enclosure has been intercepted.

In addition a destructive alarm may be connected to the detector circuit. This will take the form of an erasure device which will activate either, after a short delay to allow the intended recipient to remove the contents, or immediately. In the latter case it is necessary to switch "OFF" the detector from the outside of the enclosure prior to opening.

Connection through the wall of the enclosure is also necessary when the device to be secured has to be simultaneously connected to another system. Non contact connection may be made using an inductive coupler device. One-half being mounted on the inner surface of the enclosure, the other brought close to this position on the other side. The detector circuit can therefore be "questioned" about the time period between sealing and the present.

Figure 11:
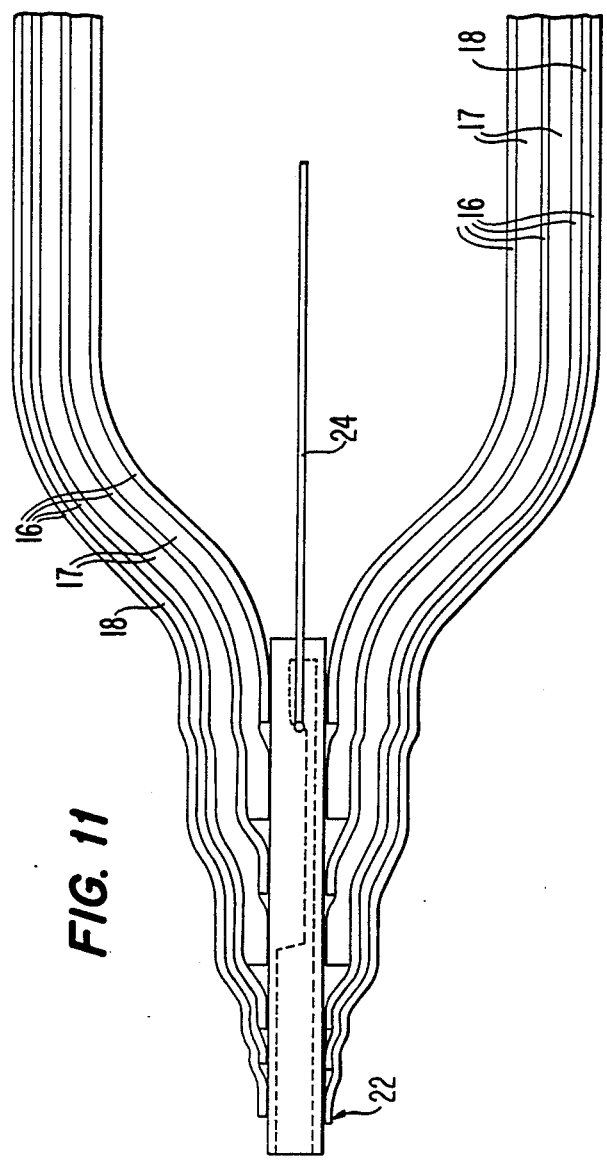
FIG. 11 is a view similar to FIG. 6 but showing the incorporation of a connector in the security enclosure.

Often however, it is preferred to make direct connection to the contents of the enclosure. Very low profile connectors exist which have plastic one piece bodies, such as Molex (trademark) 70430 Series Connectors. This type of connector 22 can be bonded into the edge of the enclosure without compromising its integrity. FIG. 11 shows the position of the connector after bonding. The matrix layer 1B is bonded directly to the sides of the connector and any attempt to pry open the layers at this point will activate the monitor circuit. It is important that the connector body material is homogeneous and made from a similar material as the enclosure insulating layers. Typically, connectors 22 suitable for this application are less than 2.5 mm thick and are manufactured from polyester.

The contacts in the connector 22 are terminated to the enclosed item using low profile polyester ribbon cable 24 such as PSE (polyester self-extinguishing) cable commercially available from W. L. Gore & Associates, Inc. Depending on the exact application some of the contacts may be used to interrogate the detector circuit, to switch it "ON" for example or to find historical information held on the memory, such as the number and time of attempted interceptions. It is not advised that it be designed to switch "OFF" the detector circuit, even with the use of a complex code, since this would reduce the integrity of the enclosure.

The other contacts, of course, are connected directly to the electronic circuit board being secured to allow operation of that circuit. In this type of application the security enclosure is protecting the information held in the electronic memory circuits. The circuit being protected would include an erase line whereby the change of voltage on that line, from 0 volts to 5 volts for example would erase all protected information. This change of voltage is initiated by the enclosure monitor circuit.

Some applications require two compartments such that the monitor circuit is physically separated from the item to be secured. In this case a line of adhesive is applied to the inner surface of the enclosure and is sealed to make an enclosure with an opening at both ends. In this way, one authority could seal and activate the monitor circuit, and another could seal the item to be protected.

It will be appreciated that a similar principle to that described above could be used to form enclosures of any required shape and size. Further, different matrices of semiconductive lines may be used as required. In particular, the lines may be arranged irregularly rather than regularly as in the illustrated embodiment.

In addition the two operative parts of the enclosure disclosed above with reference to the drawings may be used separately. Thus, an enclosure may be formed using just the sheet 18 with the matrix of lines 10, 13, or an enclosure may be formed using just two layers 17 of semiconductive fibers separated by an insulating layer 16. In either case, appropriate circuitry may be added.

It is also anticipated that the two parts described could be used either together or individually, as a flat flexible and electrically sensitive film to cover a hole in an otherwise solid enclosure, for example to cover an emergency control on an apparatus so that warning of the control cover being broken could be signaled to a remote location.

I claim:

1. A security enclosure comprising a flexible sheet of an insulating material extending over the whole of the area of the enclosure and carrying a flexible linear electrically responsive element on both sides of the sheet in a configuration so dividing the surfaces thereof that attempted opening of the enclosure changes an electrical characteristic of the element, the change being detectable by an electrical circuit, the linear electrically responsive element comprising an array of lines on each side of the sheet of insulating material extending between spaced points around the edge of the sheet, said points on one side of the sheet being in register with points on the other side, and the lines on one side of the sheet extending obliquely relative to the lines on the other side and being interconnected thereto at the registering points so as to form a single conductor dividing the sheet into a matrix of relatively small areas.

2. A security enclosure according to claim 1, in which the lines of the linear electrically responsive element are formed with a semi-conductive material.

3. A security enclosure according to claim 2 or 3, in which the linear electrically responsive element is printed on the sheet of insulating material using a semi-conductive ink.

4. A security enclosure according to claim 7, in which the ink contains carbon to provide it with its semiconductive properties.

5. A security enclosure according to claim 1, in which the lines on each side of the sheet of insulating material are parallel to each other whereby the sheet is divided into a matrix of diamond shaped areas.

6. A security enclosure according to claim 1, in which the lines on opposite sides of the sheet of insulating material are interconnected at each pair of registering points by a conductive adhesive extending through a hole formed through the sheet and the registering points.

7. A security enclosure according to claim 1, in which the sheet of insulating material is provided with a layer of an opaque material which covers the linear electrically responsive element.

8. A security enclosure according to claim 7, in which the opaque layer is formed by over-printing the sheet of insulating material with a nonconductive ink which is the same color as semiconductive ink forming the linear electrically responsive element.

9. A security enclosure according to claim 1, in which the sheet of insulating material is folded and bonded together at its edges to form the enclosure.

10. A security enclosure according to claim 1, including a monitor circuit housed within the enclosure and connected to the linear electrically responsive element for producing an electrical output when the electrical characteristic of the element changes on opening of the enclosure.

11. A security enclosure according to claim 1, further comprising two flexible layers of electrically responsive fibrous material separated by a layer of flexible insulating material, the layers extending over the whole area of the enclosure, and the length of the fibers of the fibrous material being greater than the thickness of the layer of insulating material so that piercing of the enclosure forces fibers from one of said layers of fibrous material to penetrate the layer of insulating material and contact the other of said layers of fibrous material to change an electrical characteristic of said layers of fibrous material, said change being detectable by an electrical circuit.

12. A security enclosure according to claim 11, in which the layers of electrically responsive fibrous material are layers of semiconductive fibers and the combined resistance of the layers changes on piercing.

13. A security enclosure according to claim 11, in which the layers of electrically responsive fibrous material are arranged over the flexible sheet of insulating material carrying the linear electrically responsive element and are separated therefrom by a further layer of flexible insulating material.

14. A security enclosure according to claim 13, in which the layers of electrically responsive fibrous material, the layers of insulating material, and the flexible sheet carrying the linear electrically responsive element are bonded together.

15. A security enclosure according to claim 13, in which the layers together with the sheet carrying the linear electrically responsive element are folded and bonded at the edges to form the enclosure.

16. A security enclosure according to claim 11, including a monitor circuit housed within the enclosure and connected to the linear electrically responsive element and to the layers of electrically responsive fibrous material for producing an electrical output when the electrical characteristic of the element or layers of fibrous material changes on opening of the enclosure.

17. A security enclosure according to claim 16, in which the monitor circuit is connected to the linear electrically responsive element and to the layers of fibrous material through a connector strip which is incorporated into the enclosure on closing and which carries conductive tracks forming the required connections.

18. A security enclosure according to claim 16, in which the monitor circuit is arranged to detect a change in electrical resistance of the linear electrically responsive element or a change in the combined resistance of the layers of electrically responsive fibrous material.

19. A security enclosure comprising two flexible layers of electrically responsive fibrous material separated by a layer of a flexible insulating material, the layers extending over the whole area of the enclosure, and the length of the fibers of the fibrous material being greater than the thickness of the layer of insulating material so that piercing of the enclosure forces fibers from one of said layers of fibrous material to penetrate the layer of insulating material and contact the other of said layers of fibrous material to change an electrical characteristic of the layers of fibrous material, said change being detectable by an electrical circuit.

20. A flexible sheet of an insulating material for use in forming a security enclosure, the sheet carrying a flexible liner electrically responsive element arranged on both sides of the sheet in a configuration so dividing the surface thereof that, in use, attempted opening of the enclosure changes an electrical characteristic of the element, the change being detectable by an electrical circuit, the linear electrically responsive element comprising an array of lines of conductive or semi-conductive material on each side of the sheet extending between spaced points around the edge of the sheet, said points on one side of the sheet being in register with the points on the other side, and the lines on one side of the sheet extending obliquely relative to the lines on the other side and being interconnected thereto at the registering points so as to form a single conductor dividing the sheet into a matrix of relatively small areas.

21. A flexible laminate for use in forming a security enclosure, the laminate comprising a flexible sheet according to claim 20, two flexible layers of electrically responsive fibrous material separated by a layer of a flexible insulating material, the length of the fibers of the fibrous material being greater than the thickness of the layer of insulating material so that piercing of the laminate forces fibers from one of said layers of fibrous material to penetrate the layer of insulating material and contact the other of said layers of fibrous material to change an electrical characteristic of the layers of fibrous material, said change being detectable by an electric circuit and a further layer of a flexible insulating material separating said sheet carrying the electrically responsive element from a lower of the two layers of fibrous material.

22. A flexible laminate according to claim 21 further comprising top and bottom layers of a flexible insulating material respectively over the upper layer of fibrous material and under the sheet carrying the linear electrically responsive element.

23. A flexible laminate according to claim 22, in which the sizes of the layers generally increase successively from the top to the bottom layer.

24. A flexible laminate according to claim 23, having a center line about which the laminate can be folded to form an enclosure by bonding together the registering edges of the folded laminate.

25. A flexible laminate according to claim 24, in which the edges of the bottom layer of flexible insulating material on one side of the center line are extended to form flaps for folding over and covering the joined edges of the enclosure when eventually formed.

26. A flexible laminate according to claim 24, in which the layer of flexible insulating material immediately above the sheet carrying the linear electrically responsive element has its edges of one side of the center line extended sufficiently to cover the corresponding edges of the sheet carrying the electrically responsive element so that the edges of the sheet carrying the linear electrically responsive element are insulated from each other when the laminate is folded and bonded to form an enclosure.

* * * * *